United States Patent
Evans

[15] 3,684,312
[45] Aug. 15, 1972

[54] MUD FLAP ASSEMBLY

[72] Inventor: James P. Evans, 3233 S.W. 23rd Street, Oklahoma City, Okla. 73108

[22] Filed: Sept. 28, 1970

[21] Appl. No.: 75,922

[52] U.S. Cl. .......................................... 280/154.5 R
[51] Int. Cl. ............................................. B62d 25/16
[58] Field of Search.280/154.5; 248/360, 305, 316 R

[56] References Cited

UNITED STATES PATENTS

| 3,219,363 | 11/1965 | Dalsey | 280/154.5 |
| 3,285,624 | 11/1966 | Aber | 280/154.5 |
| 3,158,386 | 11/1964 | Tillinghast | 280/154.5 |

Primary Examiner—Benjamin Hersh
Assistant Examiner—Robert R. Song
Attorney—Dunlap, Laney, Hessin & Dougherty

[57] ABSTRACT

A mud flap assembly which includes a back plate adapted to be secured to a wheeled vehicle, the assembly further having a spacer plate secured to the center of the back plate to develop a bow or convex curvature in the back plate when it is affixed to the vehicle. A front plate is provided which is bolted at its opposite ends to the back plate, and is spaced therefrom to accommodate between the two plates, the upper end portion of a mud flap made of rubber or other elastomeric material. The front plate can be separated from the back plate so as to allow any thickness of mud flap to be frictionally retained between the plates. An elongated groove is preferably formed in the front plate for the purpose of enhancing the frictional engagement of the front plate with the mud flap. A plurality of apertures may be pressed out of the front plate to afford further frictional engagement with the mud flap.

7 Claims, 4 Drawing Figures

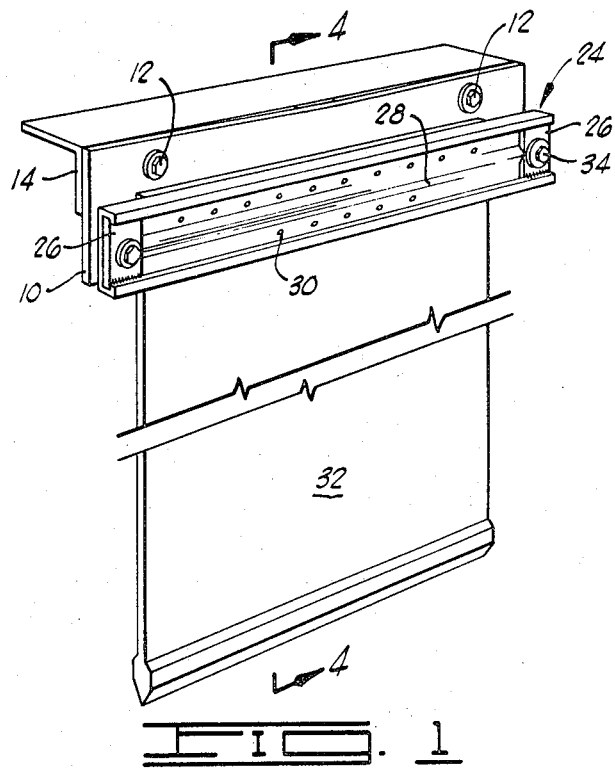
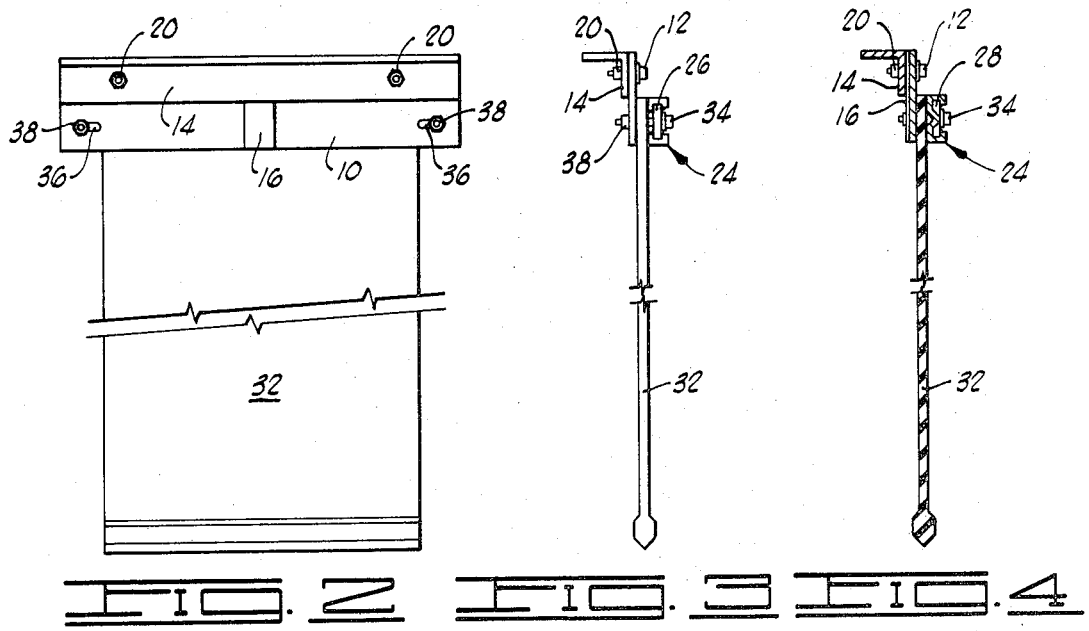

MUD FLAP ASSEMBLY

BACKGROUND OF THE INVENTION

1. Field of the Invention

This invention relates to flexible mud flaps of the type used on trucks and other vehicles for preventing mud from being thrown rearwardly by the wheels of the vehicle and interfering with following traffic.

2. Brief Description of the Prior Art

A number of types of mud flaps have heretofore been proposed for attachment to wheeled vehicles for the purpose of preventing mud from being thrown rearwardly into oncoming traffic. More recently, it has been proposed to provide mud flaps which will not be damaged in the eventuality that the mud flap is caught between the wheel of the vehicle on which it is carried and a stationary obstruction against which the wheel of the vehicle is backed, such as during backing up to a loading dock or the like. Damage to the mud flap has been obviated in prior arrangements by permitting the flexible flap to be pulled free without ripping or tearing from an anchoring structure from which it is suspended.

In my co-pending application Ser. No. 36,941 filed May 13, 1970, and entitled "Mud Flap Structure," I disclose a mud flap which is retained between a pair of substantially parallel plates secured to the vehicle upon which the mud flap is to be mounted. These plates are drawn toward each other by bolts passed through the plates, and this convergent movement of the plates results in a frictional engagement of the upper portion of a mud flap which is projected between the plates. The plates carry dimples and apertures which function to frictionally grip or engage the resilient material of the mud flap, and to retain it in position until such time as the mud flap is subjected to a force tending to tear it, or pull it free, from the supporting structure. At this time, the dimples and apertures frictionally engaging the mud flap will release the flap so that it can be pulled free without tearing.

BRIEF DESCRIPTION OF THE PRESENT INVENTION

This invention relates to a mud flap for use on trucks and other wheeled vehicles, which mud flap is frictionally retained in an anchoring structure in such a way that the mud flap can be pulled free from this anchoring structure without damage to the flap at times when forces tending to pull the mud flap downwardly with respect to the ground are applied thereto. The mud flap assembly of the present invention comprises an improvement over that structure shows in my co-copending application Ser. No. 36,941.

Broadly described, the mud flap assembly of the present invention comprises a flexible and resilient flap of material which has an upper edge portion frictionally retained in an anchoring structure. The anchoring structure includes a pair of plates, hereinafter referred to as a back plate and a front plate, which cooperate to retain between them the flexible and resilient flap of material. The back plate is adapted for securement to a truck or other vehicle by the provision of holes or apertures which can accommodate bolts extending therethrough into cooperating holes or apertures formed in a portion of the truck. The front plate, in the usage of the anchoring structure, is bolted to the back plate at a location outside the area between the plates into which the resilient flap extends. By the use of bolts connecting the front and back plates, these plates may be drawn toward each other to frictionally grip the upper edge portion of the resilient flap. The back plate of the anchoring structure carries at a central portion on the opposite side thereof from the front plate, a spacer plate which bows the back plate outwardly when the ends are secured by bolts to the truck or other vehicle on which the mud flap assembly is to be mounted. This convex curvature of the back plate aids in enhancing the frictional grip which is maintained on the resilient flap of the cooperating front and back plates.

The front plate of the mud flap structure is provided with an elongated groove extending centrally on this plate over substantially the entire length thereof, and this groove will accommodate a bulge which tends to be formed in the upper edge portion of the resilient flap of material when the flap is positioned between the front and back plates. The front plate may also, in a preferred embodiment of the invention, contain a plurality of apertures pressed out of the front plate in a rearward direction, and these apertures tend to bite into and engage the resilient flap to further enhance the frictional engagement of the anchoring structure with the flap.

An object of the present invention is to provide a mud flap assembly which permits the resilient, flexible mud flap to be pulled free of an anchoring structure without damage to the mud flap at such time as the flap is stressed during usage.

Another object of the invention is to provide a resilient flexible mud flap which can be quickly and easily mounted in an anchoring structure which is provided on a vehicle on which the mud flap is to be mounted.

A further object of the invention is to provide a mud flap assembly which facilitates the detachment and replacement of a flexible and resilient mud flap from an anchoring structure in an expeditious manner.

Other objects and advantages of the invention will become apparent as the following detailed description of the invention is read in conjunction with the accompanying drawings which illustrate the invention

BRIEF DESCRIPTION OF THE DRAWINGS

FIG. 1 is a perspective view of a mud flap assembly constructed in accordance with the present invention.

FIG. 2 is an elevation view showing the opposite side of the mud flap assembly from that which is depicted in FIG. 1.

FIG. 3 is an elevation view of the mud flap assembly of the invention as it appears when viewed from the side toward one edge of the structure.

FIG. 4 is a sectional view taken along line 4-4 of FIG. 1.

DETAILED DESCRIPTION OF A PREFERRED EMBODIMENT OF THE INVENTION

Referring to FIG. 1, shown therein is a back plate 10 forming a portion of the anchoring structure included in the mud flap assembly of the invention, which back plate is adapted to be secured by bolts 12 or other suitable fasteners to a flange 14 or other available portion of a truck or vehicle upon which the mud flap assembly is to be mounted. The back plate 10 has welded, or otherwise suitably secured to the central portion thereof, on the side of the back plate adjacent the flange 14, a spacer plate 16 which spaces the central portion of the back plate outwardly from the flange 14.

When the bolts 12 are secured in position with suitable nuts 20, the back plate is thus caused to be bowed or convexly curved, and this side in the retention of a flexible resilient flap 22 between the back plate 10, and a front plate designated generally by reference numeral 24. The front plate 24 is of generally C-shaped configuration, having its longitudinal edges curved over to form opposed channels which receive a bolt plate 26 at each end of the front plate. Along a central portion of the front plate 24, the plate is indented in a direction away from the back plate 10 ro form a longitudinal trough or groove 28 extending over a major portion of the length of the front plate.

The groove 28 terminates with its ends adjacent the bolt plates 26. Spaced along the length of the front plate 24 are a plurality of apertures or openings 30 which have been punched through the front plate, and which provide apertures into which a portion of a flexible and flap 32 may be pressed for purpose of retaining the flap between the front and back plates as hereafter described.

In the construction of the mud flap assembly of the invention, the upper edge portion of the flexible flap 32, which may be constructed of rubber or of other resilient material, is passed between the front plate 24 and the back plate 10 in a manner illustrated in FIGS. 3 and 4 of the drawings. The front plate 24 is then bolted to the back plate 10 by means of bolts 34 which are extended through the bolt plates 26 at opposite ends of the front plate, and through aligned slots 36 formed in the back plate 10 at the locations indicated in FIG. 2. Suitable nuts 38 are threaded on the bolts 34 so that the front and back plates may be drawn toward each other to compress the material of the flexible flap 32 between these plates. The flap 32 is thus frictionally engaged by the plates 10 and 24 and due to the convex curvature of the back plate 10 afforded by the spacer plate 16, a tenacious grip is maintained on the flexible flap. Moreover, the groove 28 and the openings or apertures 30 formed in the front plate 24 may, in some instances, tend to bite into or to receive the flexible material of the flap 32, and further enhance the engagement of the flap.

With the flexible flap 32 secured between the front plate 24 and the back plate 10 in the manner described, the flap is retained in operative position during all normal usage. On occasions, however, when the lower portion of the flap 32 may inadvertently be caught between the rear wheel of the truck adjacent which the mud flap assembly is mounted, and a permanent abutment of some type against which the truck is backed, the flexible flap 32 may be pulled free of the anchoring structure constituted by the front plate 24 and back plate 10 without ripping or tearing the flap. It is then a relatively simple matter for the operator of the truck to loosen the bolts 34 and reinsert the upper portion of the flap between the plates so that it may be then resecured in position.

Although a preferred embodiment of the invention has been herein illustrated, it is to be understood that various changes and innovations may be effected in the described structure without departure from the basic principles of the invention. Changes and innovations of this type are therefore deemed to be encompassed by the spirit and scope of the invention except as the same may be necessarily limited by the appended claims.

What is claimed is:

1. A mud flap assembly comprising:
    a back plate;
    a front plate of C-shaped cross-sectional configuration, said front plate having a portion extending substantially parallel to said back plate and having an elongated groove formed in said portion facing said back plate, said front plate further including bolt plate retaining means thereon for slidably retaining a pair of bolt plates adjacent said front plate;
    a flexible mud flap having an upper portion extending between said front and back plates and across said groove;
    bolt plates positioned between said bolt retaining means and engaged thereby, and located at opposite ends of said elongated groove; and
    securing members extending between said front and lack plates through said bolt plates on opposite sides of said upper portion of said mud flap for adjustably drawing said plates toward each other to frictionally grip therebetween, the upper portion of said flexibly mud flap.

2. A mud flap assembly as defined in claim 1 and further characterized as including apertures in said front plate in alignment with said upper portion of said flexibly mud flap.

3. A mud flap assembly for securement to a wheeled vehicle adjacent a wheel thereof, said assembly comprising:
    a back plate having first holes therethrough and adapted for securement through said first holes to said vehicle;
    a spacer plate centered between said first holes and secured to a central portion of said back plate for bowing said back plate between points of securement to said vehicle;
    a front plate having a portion extending substantially parallel to a portion of said back plate and positioned on the opposite side of said back plate from said spacer plate, said front plate portion having an indentation thereon cooperating with said back plate when bowed to grip a flexible mud flap therebetween;
    a flexible mud flap having a portion extending between said front and back plate and frictionally engage thereby; and
    bolts drawing said front and back plates towards each other and against said flexible mud flap.

4. A mud flap assembly as defined in claim 3 and further characterized as including bolt plates at opposite ends of said front plate and on the opposite side thereof from said back plate for receiving said bolts drawing said front plate and back plate towards each other.

5. A mud flap assembly as defined in claim 4 and further characterized as including apertures in said front plate receiving protuberant positions of said flexible mud flaps.

6. A mud flap assembly comprising:

a back plate;

a front plate having an elongated groove therein;

a spacer plate centrally positioned on said back plate on the opposite side thereof from said front plate for bowing the central portion of said back plate toward said front plate when said back plate has its opposite ends bolted to a vehicle;

a flexible mud flap having an upper portion extending between said front and back plates and across said groove; and securing members extending between said front and back plates on opposite sides of said upper portion of said mud flap for adjustably drawing said plates toward each other to frictionally grip therebetween, the upper portion of said flexible mud flap.

7. A mud flap assembly comprising:

a back plate;

a front plate of C-shaped cross-sectioned configuration, said front plate having an elongated groove in the web portion of said C-shaped cross-section and having a pair of opposed, turned over longitudinal edges extending substantially parallel to said elongated groove;

a flexible mud flap having an upper portion extending between said front and back plates and across said groove;

a pair of bolt plates positioned between, and engaged by, said turned over longitudinal edges, said bolt plates being located at opposite ends of said elongated groove; and securing members extending between said front and back plates and through said bolt plates on opposite sides of said upper portion of said mud flap for adjustably drawing said plates toward each other to frictionally grip therebetween, the upper portion of said flexible mud flap.

* * * * *